(12) United States Patent
Park (10) Patent No.: US 9,807,850 B1
(45) Date of Patent: Oct. 31, 2017

(54) APPARATUS FOR CONTROLLING OPEARTION OF ROAD STUD

(71) Applicant: PLATECH CO., LTD., Incheon (KR)

(72) Inventor: Jong Tai Park, Gyeonggi-do (KR)

(73) Assignee: PLATECH CO., LTD., Incheon (KR)

( * ) Notice: Subject to any disclaimer, the term of this patent is extended or adjusted under 35 U.S.C. 154(b) by 0 days.

(21) Appl. No.: 15/246,910

(22) Filed: Aug. 25, 2016

(30) Foreign Application Priority Data

Jul. 20, 2016 (KR) .................. 10-2016-0092129

(51) Int. Cl.
| | | |
|---|---|---|
| *H05B 37/02* | (2006.01) | |
| *H05B 33/08* | (2006.01) | |
| *E01F 9/559* | (2016.01) | |
| *F21V 31/00* | (2006.01) | |
| *F21S 8/00* | (2006.01) | |
| *F21Y 115/10* | (2016.01) | |

(52) U.S. Cl.
CPC ......... *H05B 37/0218* (2013.01); *E01F 9/559* (2016.02); *H05B 33/0854* (2013.01); *H05B 37/0227* (2013.01); *F21S 8/032* (2013.01); *F21V 31/00* (2013.01); *F21Y 2115/10* (2016.08)

(58) Field of Classification Search
CPC ............ H05B 37/0218; H05B 33/0854; H05B 37/0227; E01F 9/559
USPC ........................................................ 315/149
See application file for complete search history.

(56) References Cited

U.S. PATENT DOCUMENTS

| | | | | |
|---|---|---|---|---|
| 2004/0175232 A1* | 9/2004 | Hunter | ................... | E01F 9/559 404/16 |
| 2005/0244225 A1* | 11/2005 | Jordan | ................... | E01F 9/559 404/16 |
| 2006/0257205 A1* | 11/2006 | Jordan | ................... | E01F 9/559 404/16 |
| 2012/0249341 A1* | 10/2012 | Brown | ................ | G08G 1/0104 340/902 |
| 2013/0271014 A1* | 10/2013 | Dasaratha | ............... | F21S 8/032 315/158 |

(Continued)

FOREIGN PATENT DOCUMENTS

| | | | | | |
|---|---|---|---|---|---|
| CN | WO 2011083424 A1 | * | 7/2011 | ......... | H05B 33/0845 |
| JP | EP 1179637 A1 | * | 2/2002 | ............. | F21S 8/022 |

(Continued)

*Primary Examiner* — Dylan White
(74) *Attorney, Agent, or Firm* — The Dobrusin Law Firm, P.C.

(57) ABSTRACT

Disclosed herein is an apparatus for controlling an operation of a road stud. The apparatus includes a light emitting unit of the road stud, a power supply unit configured to supply power to the light emitting unit, an illumination sensor unit configured to apply a voltage corresponding to a peripheral illumination of the road stud, a reference-voltage generating unit configured to apply a reference voltage corresponding to a reference illumination of the road stud, a light emitting control unit configured to interrupt supply of power to the light emitting unit when the peripheral illumination of the road stud is equal to or more than the reference illumination, and configured to allow the supply of the power to the light emitting unit only when the peripheral illumination of the road stud is less than the reference illumination, and a road stud type-identification unit.

10 Claims, 6 Drawing Sheets

(56) References Cited

U.S. PATENT DOCUMENTS

| | | | | |
|---|---|---|---|---|
| 2016/0076207 A1* | 3/2016 | Moran | ...................... | E01F 9/30 340/905 |
| 2016/0108591 A1* | 4/2016 | Heerkens | ................ | E01C 17/00 362/84 |
| 2017/0002527 A1* | 1/2017 | Bahiri | ...................... | G08G 1/07 |

FOREIGN PATENT DOCUMENTS

| | | | | |
|---|---|---|---|---|
| KR | 101564902 B1 | 11/2015 | | |
| NZ | CA 2884053 A1 * | 3/2013 | .............. | G08B 5/36 |
| ZA | WO 2005107376 A2 * | 11/2005 | .............. | E01F 9/559 |
| ZA | WO 2006011064 A1 * | 2/2006 | .............. | E01F 9/559 |

\* cited by examiner

APPARATUS FOR CONTROLLING OPEARTION OF ROAD STUD

CROSS-REFERENCE TO RELATED APPLICATION

This application is based on and claims priority from Korean Patent Application No. 10-2016-0092129 filed on Jul. 20, 2016 in the Korean Intellectual Property Office, the disclosure of which is incorporated herein in its entirety by reference.

BACKGROUND

Field of the Invention

The present disclosure relates to a control apparatus for controlling a flickering operation of a road stud, the apparatus being configured to complement the shape of a road marking line formed on a road, thus enhancing visibility at night and in the case of rain.

Description of the Related Art

Unless otherwise specified, contents described in this section are not the related art for claims of this application, and should not be acceptable as the related art even if they are included in this section.

A road stud is a road appendage in accordance with Article 3 of the Korean Road Act and Article 30 of Rule on road structure/facility standards, and refers to a sight guidance apparatus that complements the shape of a paint-type road marking line, which has a serious reduction in visibility at night or in the case of rain, and precisely guides a driver's sight, thus providing traffic safety and allowing traffic to smoothly flow.

The road stud is typically divided into a reflective-type stud and a light-emitting-type stud according to its operation method. The light-emitting-type stud is sub-divided into a flickering-type stud, a lighting-type stud, and a conversion-type stud.

Among them, the reflective-type stud itself has no light emitting function, so that the stud reflects a headlight of a vehicle to perform an associated function. Therefore, the reflective-type stud is relatively inexpensive and allows for easy installation. However, the stud is problematic in that this inevitably protrudes from a road surface to some degree so as to implement a reflective surface at a predetermined angle, so that both the stability and the trafficability of a road are deteriorated and the life of the stud is shortened due to the abrasion of the reflective surface.

Further, the conventional light-emitting-type stud is configured such that components including a battery and a light emitting member are integrated with each other by molding. The light-emitting-type stud is problematic in that the battery and the light emitting member are integrated with each other by molding in the state where they are electrically connected to each other, so that the power of the battery is unnecessarily wasted, even in the case of transport or long-term storage until the road stud is manufactured and then is applied to a real road.

In order to solve the problems, the inventor(s) of the present invention have proposed "Road stud with power consumption reducing function" (Korean Patent No. 10-1564902).

This disclosure supplies power depending on whether the road stud is overturned, thus preventing the power of the battery from being unnecessarily consumed before the road stud is actually installed.

Further, it is necessary to further prevent the power of the battery from being consumed in order to prolong a light emitting life, which is an important factor in the road stud that is semi-permanently used.

In this connection, different types of road studs, for example, a pavement stud or a tunnel stud are installed for each installation place in a real site.

The pavement stud, the tunnel stud and the like are different from each other in flickering duration, flickering frequency or the like. Therefore, when the road stud performs a flickering operation of a road stud type unsuitable for the installation place, the power of a battery is unnecessarily consumed.

In addition, when different types of road studs are installed for each installation place, a control apparatus for controlling the flickering operation of the road studs depending on the types of the road studs should be separately manufactured.

SUMMARY OF THE INVENTION

Accordingly, the present invention has been made keeping in mind the above problems occurring in the related art, and the present invention is intended to propose a control apparatus for a road stud. Different types of road studs, for example, a pavement stud or a tunnel stud, are installed depending on installation place. The pavement stud, the tunnel stud and the like are different from each other in flickering duration, flickering frequency or the like. Therefore, the control apparatus of the invention prevents power of a battery from being unnecessarily consumed when the road stud performs a flickering operation of a road stud type unsuitable for the installation place. In addition, the control apparatus further improves the disclosure of the patent that was previously granted to the inventor(s) of the present invention, in other words, is configured to supply power depending on whether the road stud is overturned, thus further preventing the power of the battery from being unnecessarily consumed before the road stud is actually installed. Further, the control apparatus prevents the power of the battery from being unnecessarily consumed even after the road stud has been actually installed. Consequently, the control apparatus is capable of prolonging a light emitting life, which is an important factor in the road stud that is semi-permanently used.

In order to accomplish the above object, the present invention is intended to propose a control apparatus for a road stud, whereby the control apparatus automatically identifies the type of a current road stud that is installed, before the road studs flickers, and then performs a flickering control mode for the road stud corresponding to the current road stud type. More specifically, the control apparatus is operated as follows. A watch dog mode and a sleep mode are periodically and repeatedly performed at a preset time interval for the purpose of the flickering operation of a light emitting unit. In the watch dog mode, a peripheral illumination of the road stud is checked. According to the checked result, when the peripheral illumination of the road stud is more than a first preset illumination and is equal to or less than a second preset illumination of an illumination value that is larger than the first preset illumination, namely, when the peripheral illumination is not an illumination level of a tunnel or a similar environment but is about 100Lx or less, the road stud is identified as a pavement stud. Thus, when the peripheral illumination of the road stud is equal to or more than the reference illumination, the power supply to the light emitting unit is interrupted. Meanwhile, when the peripheral illumination of the road stud is less than the reference illumination, the power supply from the power supply unit to the light emitting unit is allowed and is maintained for a preset time. Thereafter, the power supply from the power supply unit to the light emitting unit is interrupted, and a pavement-stud flickering control mode operated in the sleep mode is performed. According to the checked result, when the peripheral illumination of the road stud is equal to or less than the first preset illumination, the road stud is identified as a tunnel stud. Thereby, the power supply to the light emitting unit is forcibly allowed and is maintained for a preset time. Thereafter, the power supply from the power supply unit to the light emitting unit is interrupted, and a tunnel-stud flickering control mode operated in the sleep mode is performed.

According to embodiments, when a road stud is installed and a battery starts to supply power, namely, when the road stud actually begins a flickering operation, the flickering operation corresponding to a type of the road stud that is currently operating is performed, thus preventing the power of the battery from being unnecessarily consumed.

That is, different types of road studs, for example, a pavement stud or a tunnel stud are installed for each installation place in a site. The pavement stud, the tunnel stud and the like are different from each other in flickering duration, flickering frequency or the like. Therefore, when the road stud performs a flickering operation of a road stud type unsuitable for the installation place, the power of the battery is unnecessarily consumed.

In addition, the disclosure of the patent (Korean Patent No. 10-1564902) that was previously granted to the inventor (s) of the present invention is configured to supply power depending on whether the road stud is overturned, thus further preventing the power of the battery from being unnecessarily consumed before the road stud is actually buried and installed. Further, an embodiment is intended to prevent the power of the battery from being unnecessarily consumed even after the road stud has been installed.

Moreover, an embodiment is in combination with the above-mentioned patent disclosure, namely, is operated in conjunction with a power supply operation performed depending on whether the road stud is overturned, thus further preventing the power of the battery from being consumed.

That is, an embodiment prevents the power of the battery from being supplied to a control apparatus for a road stud during transport and storage, before the road stud is actually buried and installed, thus preventing the power of the battery from being unnecessarily consumed, and performs a flickering operation corresponding to a type of a road stud that is currently operating, when the road stud is installed and the battery starts to supply power, namely, when the flickering operation of the road stud is actually initiated, thus further preventing the power of the battery from being consumed.

Consequently, an embodiment is capable of prolonging a light emitting life, which is an important factor in the road stud that is semi-permanently installed, and is capable of prolonging the light emitting life, particularly in an installed state.

In addition, an embodiment allows the light emitting operation of a road stud to be smoothly controlled, regardless of a type of the road stud that is actually installed in a site, with a single control apparatus, and performs the light emitting operation that is fit for the site, thus providing the light emitting operation suitable for the real site and enhancing light emitting efficiency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, preferred embodiments of the present invention have been disclosed for illustrative purposes, so that those skilled in the art will appreciate that various modifications, additions and substitutions are possible, without departing from the scope and spirit of the invention as disclosed in the accompanying claims.

Figure 1:
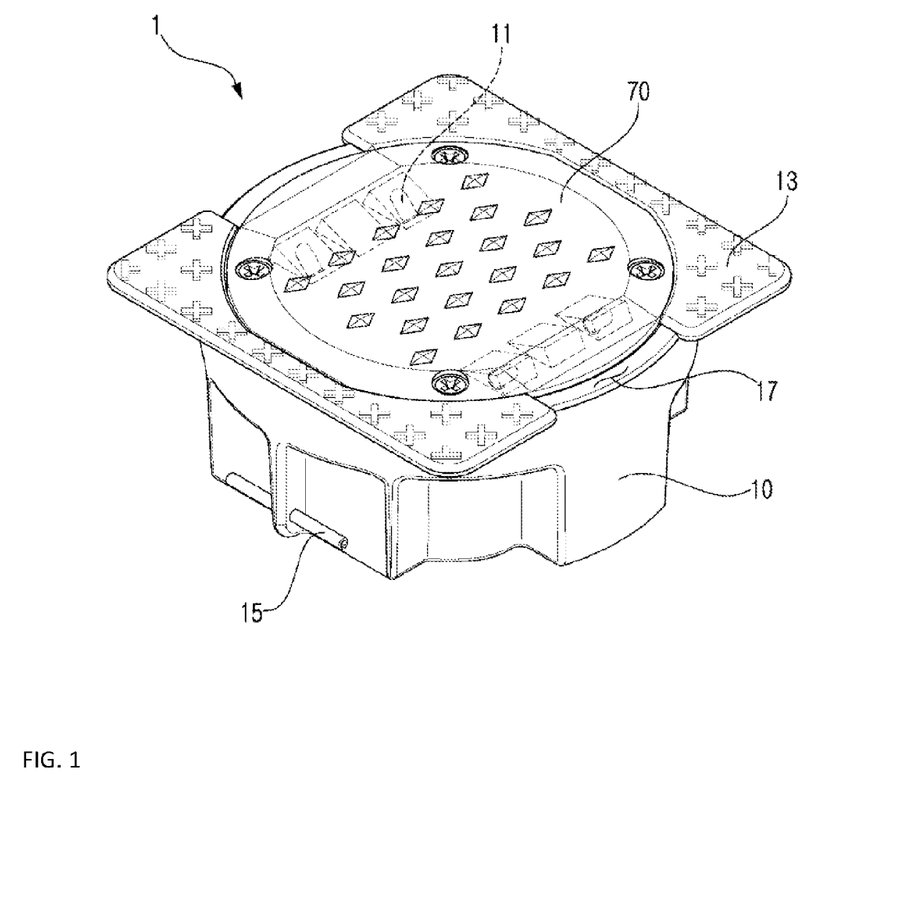
FIG. 1 is a perspective view illustrating a control apparatus for a road stud according to an embodiment.
Figure 2:
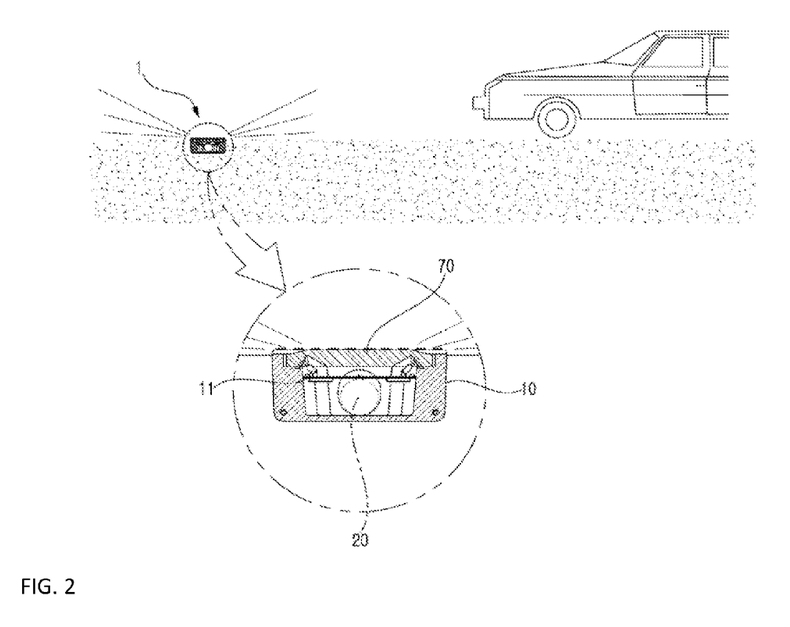
FIG. 2 is a view illustrating a state in which the control apparatus for the road stud according to the embodiment is used.

FIG. 1 is a view illustrating the configuration of a road stud according to an embodiment, and FIG. 2 is a view illustrating a state in which the road stud according to the embodiment is used.

As illustrated in FIGS. 1 and 2, a road stud 1 according to an embodiment is intended to complement the shape of a road marking line formed on a road, thus enhancing visibility at night and in the case of rain. Referring to FIGS. 1 and 2, the road stud 1 includes a stud body 10 that is mounted on a road and has a light emitting unit 11 on a top thereof, a power supply unit 20, an illumination sensor unit, a reference-voltage generating unit, an overturning detecting sensor unit, and a light emitting control unit that are provided in the stud body 10, and a cover lens 70 that is water-tightly coupled to the top of the stud body 10.

In this regard, the stud body 10 defines a component molding frame of the road stud 1 according to the embodiment, and is formed in the shape of a cylindrical casing to facilitate the accommodation of components and the integration thereof by molding.

The light emitting unit 11 is provided on the top of the stud body 10, and an extension plate 13 is provided on an upper edge of the stud body 10 to protrude outwards, thus allowing the road stud 1 according to the embodiment to be installed to be parallel to a road surface. For example, cross-shaped anti-slip protrusions are formed on an upper surface of the extension plate 13.

Further, pins 15 are fitted to both sides of a lower portion of the stud body 10. The pins 15 serve to prevent the stud body 10 from being undesirably rotated or removed, when an installation hole is formed in the road and then the road stud 1 according to the embodiment is installed therein via an epoxy adhesive.

As illustrated in FIGS. 1 and 2, the road stud 1 according to the embodiment is manufactured as follows: after components including the power supply unit (battery) 20 are installed in the stud body 10, they are integrated into each other through molding to achieve a watertight structure and a cover lens 70 that will be described later is water-tightly coupled thereto. In this case, the light emitting control unit 60 prevents the power of the power supply unit 20 from being unnecessarily consumed during a period from a time when the manufacture of the road stud 1 according to the embodiment has been completed to a time when the road stud 1 is actually installed in the road, namely, during transport or long-term storage, even if the components are installed by molding.

When the road stud 1 according to the embodiment is installed, the road stud 1 is provided with a side light emitting unit and a top light emitting unit. In this regard, the pavement stud is provided with both the side light emitting unit and the top light emitting unit, while the tunnel stud is provided with only the side light emitting unit. In this case, the side light emitting unit is, for example, a LEAD TYPE LED, while the top light emitting unit is a Power LED. Both the pavement stud and the tunnel stud perform a flickering operation in a state where the light emitting surface faces upwards. Here, the lighting duration of the side light emitting unit is set as a reference lighting duration, and the lighting duration of the top light emitting unit is set to be longer than the lighting duration of the side light emitting unit by a preset time (the lighting duration of the side light emitting unit is set to be relatively shorter), thus allowing a user's sight to be conveniently guided and preventing power consumption. Consequently, this enables a driver of a vehicle to effectively perceive the road marking line, thus preventing a traffic accident and guaranteeing safe driving.

Figure 3:
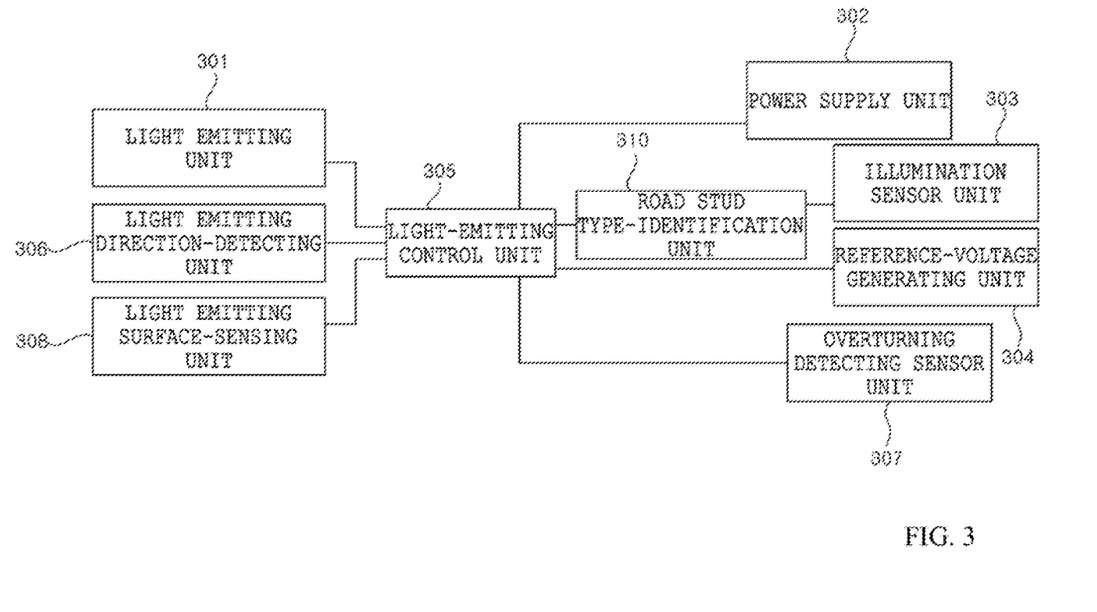
FIG. 3 is a block diagram illustrating the control apparatus for the road stud according to the embodiment.
Figure 4A:
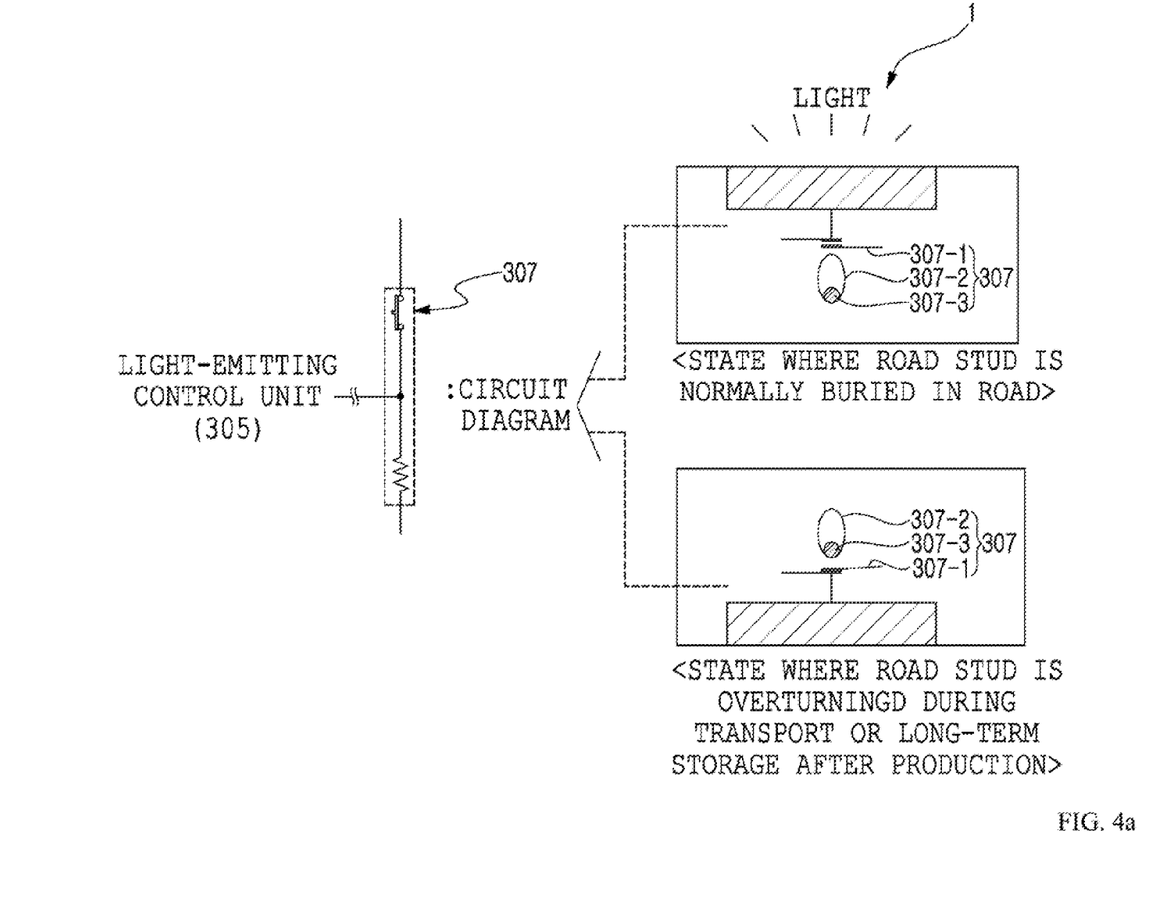
FIG. 4A is a view illustrating the configuration of an overturning detecting sensor unit applied to the control apparatus for the road stud according to the embodiment.
Figure 4B:
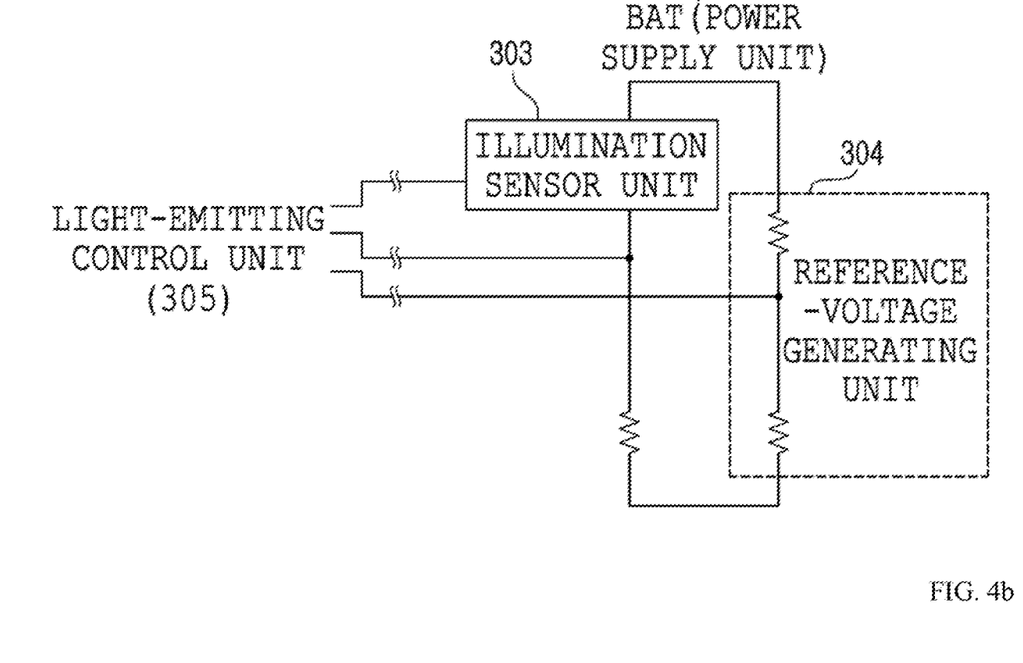
FIG. 4B is a view illustrating a peripheral illumination-detecting configuration of the road stud applied to the control apparatus for the road stud according to the embodiment.

FIG. 3 is a view conceptually illustrating the configuration of the control apparatus for the road stud according to the embodiment, FIG. 4A is a view illustrating the configuration of an overturning detecting sensor unit applied to the control apparatus for the road stud according to the embodiment, and FIG. 4B is a view illustrating the peripheral illumination-detecting configuration (the illumination sensor unit and the reference-voltage generating unit) of the road stud applied to the control apparatus for the road stud according to the embodiment.

As illustrated in FIGS. 3, 4A and 4B, the control apparatus for the road stud according to the embodiment includes a light emitting unit 301 of the road stud, a power supply unit 302 configured to supply power to the light emitting unit 301, an illumination sensor unit 303 configured to apply a voltage corresponding to a peripheral illumination of the road stud, a reference-voltage generating unit 304 configured to apply a reference voltage corresponding to a reference illumination of the road stud, a road stud type-identification unit 310 configured to identify the type of the road stud in conjunction with the illumination sensor unit 303, and a light emitting control unit 305. The light emitting control 305 is operated as follows. First, the applied voltage of the illumination sensor unit 303 is compared with the reference voltage of the reference-voltage generating unit 304. Based on the compared result, if the peripheral illumination of the road stud is equal to or more than the reference illumination, the supply of the power to the light emitting unit 301 is interrupted. Only when the peripheral illumination of the road stud is less than the reference illumination, the supply of the power to the light emitting unit 301 is allowed. In this way, the flickering control mode of the light emitting unit 301 is performed to perform the sight guidance operation of the road stud. Particularly, the light emitting control unit 305 performs the flickering control mode of the light emitting unit 301 in a different manner, depending on the road stud type (e.g. pavement stud, tunnel stud, etc.) identified by the road stud type-identification unit 310.

Here, the light emitting unit 301 is provided on the top of the stud body 10. The light emitting unit 301 emits light to enable the road marking line to be easily visible, thus guaranteeing safe driving particularly at night as well as in bad weather such as fog or rain, and is formed of a light emitting diode (LED) installed in the general road stud. The light emitting unit 301 is formed of a white light emitting diode (LED) in the case of a road marking line (normal lane) located at an outer region of the road, is formed of a yellow light emitting diode (LED) in the case of a road marking line (center line) located at a central region of the road, and is formed of a white emitting diode (LED) or a light emitting diode (LED) of a daylight color in the case of a road marking line in a tunnel.

The power supply unit 302 is provided in the stud body 10. The power supply unit 302 supplies power to emit the light of the light emitting unit 301, and uses a battery. The power supply unit 302 is provided in a lower portion of the stud body 10.

The illumination sensor unit 303 senses the peripheral illumination of the stud body 10 to apply a voltage corresponding to the peripheral illumination of the stud body 10 to the light emitting control unit 305 that will be described later.

The illumination sensor unit 303 senses the peripheral illumination of the road stud, and is preferably a CDS sensor that is known as the most general light sensor for converting the brightness of light (illumination) into electrical properties. Since the CDS sensor increases resistance not in a linear shape in proportion to the illumination but in a shape similar to a logarithmic chart, the sensor does not obtain an accurate illumination (Lux) value but merely senses whether the illumination is bright or dark. This sensor is also referred to as a photo conductive cell. According to the embodiment, the illumination sensor unit 30 may be formed of a photo diode element that is suitable for measuring the illumination value.

The reference-voltage generating unit 304 applies a reference voltage corresponding to a reference illumination value for detecting whether the peripheral illumination is bright or dark in response to a signal of the illumination sensor unit 303, to the light emitting control unit 305 that will be described later. To be more specific, as illustrated in FIG. 4, the power of the power supply unit 302 is divided into two resistances, and simultaneously, a junction located between the two resistances is electrically connected with the light emitting control unit 305 by wiring.

The road stud type-identification unit 310 identifies the type of the road stud that is currently being used. In detail, the road stud type-identification unit 310 identifies the road stud as a pavement stud if the peripheral illumination of the road stud is more than a first preset illumination and is equal to or less than a second preset illumination of an illumination value that is larger than the first preset illumination, in other words, in a place where the peripheral illumination is about 100Lx or less, and identifies the road stud as a tunnel stud if the peripheral illumination of the road stud is equal to or less than the first preset illumination, in other words, in a dark place, when it is determined whether the peripheral illumination of the road stud is more than the first preset illumination and the peripheral illumination is compared with the second preset illumination (about 100Lx or less) of the illumination value that is larger than the first preset illumination.

The overturning detecting sensor unit 307 senses whether the stud body 10 is overturned, and then applies the sensed signal to the light emitting control unit 305. According to the embodiment, the road stud 1 is transported and stored for a lengthy period of time in the state where the stud body 10 is overturned, during a period from a time when the road stud 1 has been produced to a time when it is installed in a real road. Thereby, when the road stud 1 is installed in the real road, it is normally installed in the state where the stud body 10 is not overturned. The overturning detecting sensor unit 307 detects whether the stud body 10 is overturned, and applies a signal, informing whether the road stud 1 according to the embodiment is currently installed in the road, to the light emitting control unit 305. If the road stud is not installed in the road yet, the power of the power supply unit 302 is not applied to the light emitting unit 301. In contrast, only when the road stud has been installed in the road, the power of the power supply unit 302 is applied to the light emitting unit 305 (an example of a specific structure will be described later).

In a first mode set by a user when he or she manipulates a key, the light emitting control unit 305 periodically and repeatedly performs a watch dog mode and a sleep mode at a preset time interval to perform a flickering operation of the light emitting unit. The light emitting control unit performs a pavement-stud flickering control mode in which, if the road stud type identified by the road stud type-identification unit 310 is the pavement stud, in the watch dog mode, the supply of the power from the power supply unit 302 to the light emitting unit 301 is interrupted when the peripheral illumination of the road stud is equal to or more than the reference illumination; and the supply of the power from the power supply unit 302 to the light emitting unit 301 is allowed and is maintained for a preset time, the supply of the power from the power supply unit 302 to the light emitting unit 301 is interrupted and then the light emitting control unit performs the sleep mode when the peripheral illumination of the road stud is less than the reference illumination.

the light emitting control unit performs a tunnel-stud flickering control mode in which, if the road stud type identified by the road stud type-identification unit is the tunnel stud, in the watch dog mode, the supply of the power to the light emitting unit is forcibly allowed and is maintained for a preset time, the supply of the power from the power supply unit to the light emitting unit is interrupted and then the light emitting control unit performs the sleep mode. That is, when the current road stud type is the pavement stud and the peripheral illumination of the road stud is equal to or less than the preset peripheral illumination, namely, only in a place where the peripheral illumination is about 100Lx or less, the supply of the power from the power supply unit 302 to the light emitting unit 301 is allowed, is maintained for a preset time, is interrupted, and the light emitting control unit performs the sleep mode. In contrast, the light emitting control unit 305 performs a tunnel-stud flickering control mode in which, if the road stud type identified by the road stud type-identification unit 310 is the tunnel stud, in the watch dog mode, the supply of the power to the light emitting unit 301 is forcibly allowed and is maintained for a preset time, the supply of the power from the power supply unit 302 to the light emitting unit 301 is interrupted and then the light emitting control unit performs the sleep mode. That is, when the current road stud type is the tunnel stud, the supply of the power from the power supply unit 302 to the light emitting unit 301 is forcibly allowed, in other words, is always allowed regardless of whether an installed place is bright or dark, is maintained for a preset time, is interrupted, and then the light emitting control unit performs the sleep mode.

Meanwhile, as illustrated in FIG. 3, the control apparatus for the road stud according to an embodiment has another configuration. That is, the control apparatus directly senses the light emitting surface of the road stud, and performs the flickering control mode of the road stud in a different manner depending on the road stud type according to the embodiment, based on the sensed result.

To be more specific, the control apparatus for the road stud according to another embodiment includes a light emitting unit 301 of the road stud, a power supply unit 302 configured to supply power to the light emitting unit 301, an illumination sensor unit 303 configured to apply a voltage corresponding to a peripheral illumination of the road stud, a reference-voltage generating unit 304 configured to apply a reference voltage corresponding to a reference illumination of the road stud, a road stud type-identification unit 310 configured to identify a type of the road stud in conjunction with the illumination sensor unit 303, a light emitting surface-sensing unit 308 configured to sense a light emitting surface of the road stud, and a light emitting control unit 305 configured to interrupt supply of power to the light emitting unit 301 when the peripheral illumination of the road stud is equal to or more than the reference illumination, and configured to allow the supply of the power to the light emitting unit 301 only when the peripheral illumination of the road stud is less than the reference illumination, based on a result comparing the applied voltage of the illumination sensor unit 303 with the reference voltage of the reference-voltage generating unit 304, thus performing a flickering control mode of the light emitting unit 301 and thereby carrying out a sight guidance operation of the road stud. Particularly, the light emitting control unit 305 differently performs the flickering control mode of the light emitting unit 301, depending on the road stud type (e.g., the pavement stud, the tunnel stud, etc.) identified by the road stud type-identification unit 310 and the light emitting surface of the road stud sensed by the light emitting surface-sensing unit 308.

Particularly, the light emitting control unit 305 periodically and repeatedly performs a watch dog mode and a sleep mode at a preset time interval to perform a flickering operation of the light emitting unit, in a first mode set by a user when he or she manipulates a key. The light emitting control unit checks both the peripheral illumination of the road stud and the light emitting surface of the road stud in the watch dog mode. According to the checked result, if the light emitting surface of the road stud is composed of only a side light emitting surface and a type of the road stud identified by the road stud type-identification unit is a pavement stud, the supply of the power to the light emitting unit is interrupted when the peripheral illumination of the road stud is equal to or more than the reference illumination, and the supply of the power from the power supply unit to the light emitting unit is allowed, is maintained for a preset time, the supply of the power from the power supply unit to the light emitting unit is interrupted, and then the light emitting control unit performs the sleep mode when the peripheral illumination of the road stud is less than the reference illumination. As such, the light emitting control unit performs a pavement-stud flickering control mode. Meanwhile, according to the checked result, if the light emitting surface of the road stud includes the side light emitting surface and a top light emitting surface and the type of the road stud identified by the road stud type-identification unit in the watch dog mode is a tunnel stud, the supply of the power to the light emitting unit is forcibly allowed, is maintained for a preset time, the supply of the power from the power supply unit to the light emitting unit is interrupted and then the light emitting control unit performs the sleep mode. As such, the light emitting control unit performs a tunnel-stud flickering control mode.

Further, in a second mode set by the user when he or she manipulates the key, the light emitting control unit periodically and repeatedly performs a watch dog mode and a sleep mode at a preset time interval to perform a flickering operation of the light emitting unit 301, the light emitting control unit checks the peripheral illumination of the road stud and the light emitting surface of the road stud in the watch dog mode, and identifies the road stud as the pavement stud if the light emitting surface of the road stud is composed of only the side light emitting surface and the peripheral illumination of the road stud is equal to or more than the reference illumination, or the peripheral illumination of the road stud is less than the reference illumination while a difference value between the peripheral illumination of the road stud and the reference illumination is not within a range of a preset difference value, or the peripheral illumination of the road stud is less than the reference illumination while the difference value between the peripheral illumination of the road stud and the reference illumination is within the range of the preset difference value but is not maintained for a preset time, so that the light emitting control unit performs a pavement-stud flickering control mode in which the supply of the power to the light emitting unit 301 is interrupted when the peripheral illumination of the road stud is equal to or more than the reference illumination, and the supply of the power from the power supply unit 302 to the light emitting unit 301 is allowed and is maintained for a preset time, the supply of the power from the power supply unit 302 to the light emitting unit 301 is interrupted, and then the light emitting control unit performs the sleep mode when the peripheral illumination of the road stud is less than the reference illumination, and the light emitting control unit checks the peripheral illumination of the road stud and the light emitting surface of the road stud in the watch dog mode, and identifies the road stud as the tunnel stud if the light emitting surface of the road stud includes both the side light emitting surface and the top light emitting surface, the peripheral illumination of the road stud is less than the reference illumination while the difference value between the peripheral illumination of the road stud and the reference illumination is within the range of the preset difference value and is maintained for the preset time, so that the light emitting control unit performs a tunnel-stud flickering control mode in which the supply of the power to the light emitting unit 301 is forcibly allowed and maintained for a preset time, the supply of the power from the power supply unit 302 to the light emitting unit 301 is interrupted, and then the light emitting control unit performs the sleep mode.

FIG. 4A is a view illustrating the structure of the overturning detecting sensor unit 50 according to another embodiment. In detail, the overturning detecting sensor unit 50 includes a reed switch 51 installed in the stud body 10, a slit 53 formed in the stud body 10 to be vertically formed in a lower portion of the reed switch 51, and a movable magnet 55 that moves up and down in the slit 53 by the gravity and turns the reed switch 51 on or off.

The reed switch 51 is operated as follows: contact points are normally detached from each other by their own elasticity, thus generating an OFF control signal, while the contact points are attached to each other by a magnetic force only when the movable magnet 55 approaches the reed switch, thus generating an ON control signal.

Therefore, when the stud body 10 is overturned as the road stud 1 according to the embodiment is transported and stored, the movable magnet 55 is moved to approach the reed switch 51 by the gravity in the slit 53, so that the ON control signal is transmitted from the reed switch 51 to the light emitting control unit 60, thus preventing the power of the power supply unit 20 from being consumed through the light emitting unit 11. Further, when the stud body is installed on the road such that it is not overturned, the movable magnet 55 is moved away from the red switch 51 by the gravity in the slit 53, so that the OFF control signal is transmitted from the reed switch 51 to the light emitting control unit 60, and thereby the light emitting unit 11 is turned on by the power of the power supply unit 20.

Thus, the light emitting control unit 60 performs a control mode of an example that is different from the example described with reference to FIG. 3, in conjunction with the overturning detecting sensor unit 50. That is, based on the control signal of the overturning detecting sensor unit 50, when the stud body 10 is overturned, the supply of the power to the light emitting unit 11 is primarily interrupted. Only when the stud body 10 is not overturned, the supply of the power to the light emitting unit 11 is allowed. According to an embodiment, for a preset time from a moment when the road stud is overturned, the peripheral illumination of the road stud is detected to determine whether it is more than the calculated average peripheral illumination value of the road stud and the first preset illumination, and is compared with the second preset illumination of the illumination value that is larger than the first preset illumination, thus determining the type of the road stud (e.g., the pavement stud and the tunnel stud). Thereby, the control mode is performed in a different manner depending on the type of the road stud.

In addition, the operation performed in conjunction with the overturning detecting sensor unit is applied to the operation of the control apparatus for the road stud.

Figure 5:
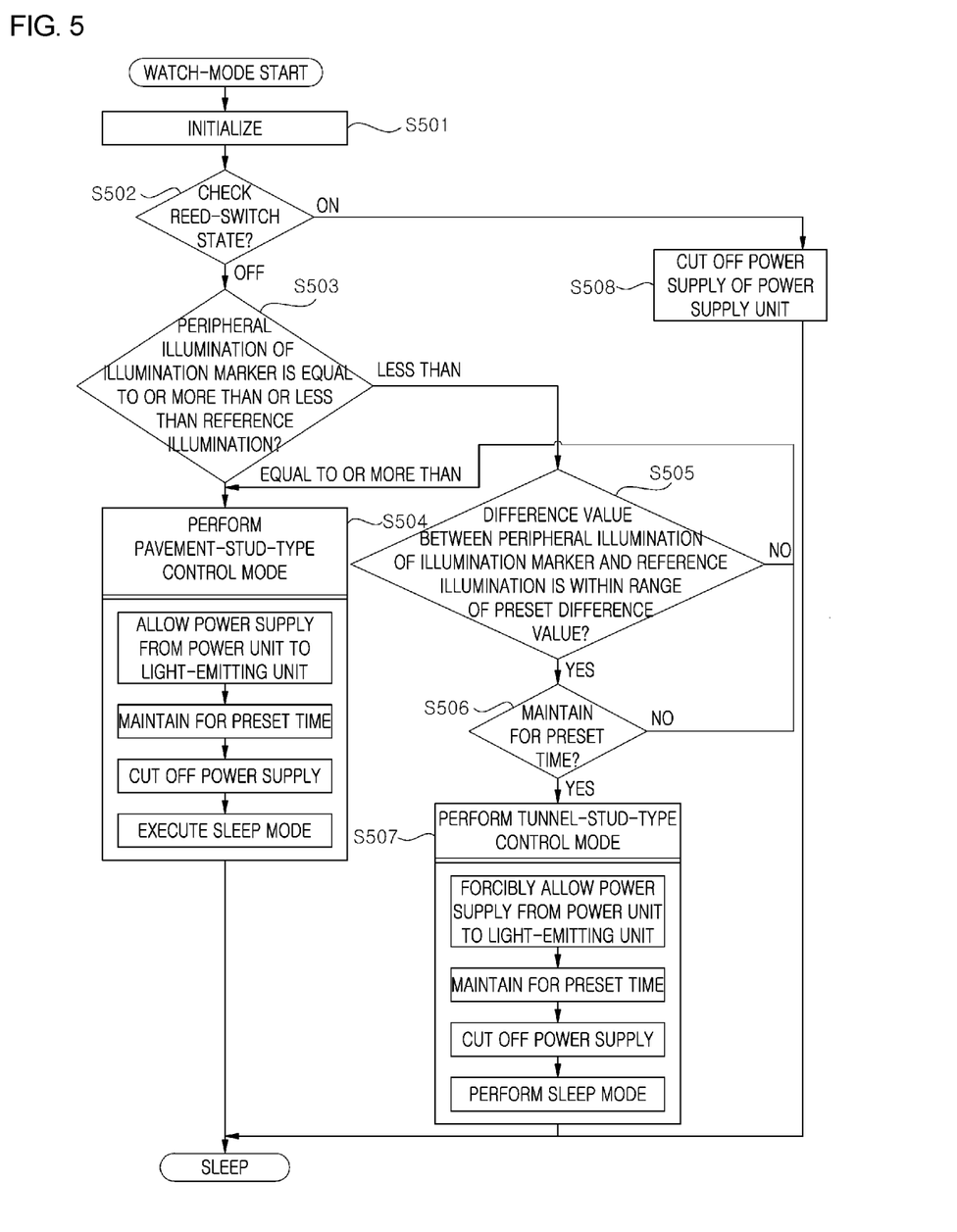
FIG. 5 is a flowchart illustrating an operation of a control apparatus for a road stud according to an embodiment.

FIG. 5 is a flowchart sequentially illustrating an operation of a control apparatus for a road stud according to an embodiment.

The operation of the control apparatus for the road stud according to the embodiment of FIG. 5 is performed differently from the operation of the control apparatus for the road stud described with reference to FIG. 3. That is, the operation of the control apparatus for the road stud described with reference to FIG. 3 is suitable for general pavement environment (including the weather of the surroundings of the pavement), whereas the operation of the control apparatus for the road stud of FIG. 5 is suitable for a place or pavement environment where it is frequently cloudy, rainy or foggy. FIG. 5 is a flowchart sequentially illustrating the operation performed in conjunction with the overturning detecting sensor unit of FIG. 4.

As illustrated in FIG. 5, the control apparatus for the road stud according to the embodiment is basically operated based on the sensed signal of the overturning detecting sensor unit. That is, when the road stud is overturned, the supply of the power from the power supply unit to the light emitting unit is primarily interrupted. In contrast, only when the road stud is not overturned, the secondary control mode is performed to actually operate the road stud (S501, S502).

To be more specific, when the road stud is overturned for the purpose of transport and long-term storage after production, the supply of the power from the power supply unit to the light emitting unit is forcibly interrupted regardless of the peripheral illumination of the road stud and then the sleep mode is performed. Only when the road stud is not overturned, that is, the road stud is normally installed in the road while not being overturned, the secondary control mode is performed to actually operate the road stud.

According to the embodiment, the control mode differently controls the flickering operation of the light emitting unit depending on the type of the road stud.

A specific operation will be described.

First, for the flickering operation of the light emitting unit, the watch dog mode and the sleep mode are periodically and repeatedly performed at a preset time interval.

In the watch dog mode, first, a signal detected by the overturning detecting sensor unit is primarily checked. Here, when the road stud is not overturned, namely, when the road stud is normally installed in the road, the peripheral illumination of the road stud is detected.

That is, the peripheral illumination of the road stud is detected in a place where the road stud is normally installed in the road.

Next, depending on the detected peripheral illumination of the road stud, namely, the peripheral illumination of the road stud in the place where the road stud is normally installed in the road, the type of the road stud is automatically identified.

To be more specific, for a preset time from a moment when the road stud is normally installed in the road, the peripheral illumination of the road stud is detected and thereby the average peripheral illumination value of the road stud is calculated. In this regard, when the calculated average peripheral illumination value of the road stud, namely, when the average peripheral illumination of the road stud is equal to or more than the reference illumination for a preset time from a moment when the road stud is normally installed in the road (S503), that is, in a bright place, the road stud is essentially identified as the pavement stud. Further, when the average peripheral illumination of the road stud is less than the reference illumination for a preset time from a moment when the road stud is normally installed in the road and a difference value between the peripheral illumination of the road stud and the reference illumination is not within the range of the preset difference value (S505), that is, in a place where it is dark but is not especially dark like a tunnel, or when the average peripheral illumination of the road stud is less than the reference illumination for a preset time from a moment when the road stud is normally installed in the road and the difference value between the peripheral illumination of the road stud and the reference illumination is within the range of the preset difference value and is not maintained for a preset time (S506), that is, in a place where it is temporarily especially dark like a tunnel but is not a tunnel, the road stud is identified as the pavement stud.

On the other hand, for a preset time from a moment when the road stud is normally installed in the road, when the average peripheral illumination of the road stud is less than the reference illumination, the difference value between the average peripheral illumination of the road stud and the reference illumination is within the range of the preset difference value (i.e. a preset range of the difference value corresponding to the inherent illumination of the tunnel) and is maintained for a preset time (S503, S505 and S506), the road stud is identified as the tunnel stud.

That is, when the peripheral illumination of the road stud is not dark, unlike at night or in a rainy or foggy day, corresponds to the inherent illumination of the tunnel, and is continuously maintained for a predetermined time, the road stud is identified as a tunnel stud.

Thereafter, the control mode corresponding to the identified type of the road stud is performed.

To be more specific, when the identified type of the road stud is the pavement stud, the supply of the power from the power supply unit to the light emitting unit is allowed, is maintained for a preset time, is interrupted and then the light emitting control unit performs the sleep mode (S504).

In contrast, when the identified type of the road stud is the tunnel stud, the supply of the power from the power supply unit to the light emitting unit is forcibly allowed, that is, is always allowed regardless of the brightness of a place, is maintained for a preset time, is interrupted and then the light emitting control unit performs the sleep mode (S507).

After the sleep mode is performed for a preset time, the watch dog mode is performed again. These operations are alternately performed at a preset time interval.

Meanwhile, when the road stud is the pavement stud, this has the top light emitting unit as well as the side light emitting unit. Light directed at a vehicle, namely, side light is emitted for a relatively shorter time, while light directed at a person and perceived by the person, namely, top light is emitted for a relatively longer time.

In this connection, the control apparatus for the road stud according to the embodiment performs the following operation so as to make it more convenient to guide a user's sight and further prevent power from being consumed.

That is, first, the light emitting direction (including the side direction and the top direction) or the light emitting angle of the light emitting unit are detected (in this case, a structure using a light receiving element is included). Further, the lighting duration of the side light emitting unit is set to the reference lighting duration, so that the lighting duration of the side light emitting unit is set to be shorter than the lighting duration of the top light emitting unit by a preset time and the lighting duration of the top light emitting unit is set to be longer than the lighting duration of the side light emitting unit by a preset time. For example, the lighting duration of the side light emitting unit is set to 0.0025 seconds, and the lighting duration of the top light emitting unit is set to 0.0028 seconds, which is longer than 0.0025 seconds by 0.0003 seconds. Next, the light emitting direction of the light emitting unit is perceived based on the detected result of the light emitting direction-detecting unit. If the perceived light emitting direction of the light emitting unit includes the top light emitting direction, the supply of power to both the side light emitting unit and the top light emitting unit is allowed when power is supplied from the power supply unit to the light emitting unit. When the supply of the power to the side light emitting unit is allowed, the power is supplied for a time that is shorter than the lighting duration of the top light emitting unit, by a preset time. When the supply of the power to the top light emitting unit is allowed, the power is supplied for a time that is longer than the lighting duration of the side light emitting unit, by a preset time.

Consequently, this makes it more convenient to guide a user's sight and further prevents power from being consumed.

Such an operation may be applied to the operation of the control apparatus for the road stud according to all the above-described embodiments.

Meanwhile, in order to further prevent power from being consumed, the following operation is performed.

That is, when the supply of power is allowed from the power supply unit to the light emitting unit, a value of power that is to be supplied to the side light emitting unit for a preset initial time is detected and thereby an initial average power value of the side light emitting unit is calculated. Further, a value of power that is to be supplied to the top light emitting unit for a preset initial time is detected and thereby an initial average power value of the top light emitting unit is calculated. Thus, when the preset initial time has elapsed and power corresponding to the preset value in the calculated initial average power value of the side light emitting unit is supplied to the side light emitting unit, the supply of the power is allowed for a time that is shorter than the lighting duration of the top light emitting unit by a preset time. For example, the supply of power is allowed at a value that is 60% or more of the initial average power value, thus prolonging a service life. Further, when the preset initial time has elapsed and power corresponding to the preset value in the calculated initial average power value of the top light emitting unit is supplied to the top light emitting unit, the supply of the power is allowed for a time that is longer than the lighting duration of the side light emitting unit by a preset time.

As described above, according to an embodiment, when a road stud is installed and a battery starts to supply power, namely, when the road stud actually begins a flickering operation, the flickering operation corresponding to a type of the road stud that is currently operating is performed, thus preventing the power of the battery from being unnecessarily consumed.

That is, different types of road studs, for example, a pavement stud or a tunnel stud are installed for each installation place in a site. The pavement stud, the tunnel stud and the like are different from each other in flickering duration, flickering frequency or the like. Thus, when the road stud performs a flickering operation of a road stud type unsuitable for the installation place, the power of the battery is unnecessarily consumed.

Therefore, the invention allows the flickering operation corresponding to the type of the current road stud to be performed, thus preventing the power of the battery from being unnecessarily consumed.

In addition, the disclosure of the patent (Korean Patent No. 10-1564902) that was previously granted to the inventor(s) of the present invention is configured to supply power depending on whether the road stud is overturned, thus preventing the power of the battery from being unnecessarily consumed before the road stud is actually buried and installed. Further, an embodiment is intended to prevent the power of the battery from being unnecessarily consumed even after the road stud has been installed.

Moreover, an embodiment is in combination with the above-mentioned patent disclosure, namely, is operated in conjunction with a power supply operation performed depending on whether the road stud is overturned, thus further preventing the power of the battery from being consumed.

That is, an embodiment prevents the power of the battery from being supplied to a control apparatus for a road stud during transport and storage, before the road stud is actually buried and installed, thus preventing the power of the battery from being unnecessarily consumed, and performs a flickering operation corresponding to a type of a road stud that is currently operating, when the road stud is installed and the battery starts to supply power, namely, when the flickering operation of the road stud is actually initiated, thus further preventing the power of the battery from being consumed.

Consequently, an embodiment is capable of prolonging a light emitting life, which is an important factor in the road stud that is semi-permanently used, and is capable of prolonging the light emitting life, particularly in an installed state.

In addition, an embodiment allows the light emitting operation of a road stud to be smoothly controlled, regardless of a type of the road stud that is actually installed in a site, with a single control apparatus, and performs the light emitting operation that is fit for the site, thus providing the light emitting operation suitable for the real site and enhancing light emitting efficiency.

What is claimed is:

1. An apparatus for controlling an operation of a road stud, the apparatus comprising:
    a light emitting unit of the road stud;
    a power supply unit configured to supply power to the light emitting unit;
    an illumination sensor unit configured to apply a voltage corresponding to a peripheral illumination of the road stud;
    a reference-voltage generating unit configured to apply a reference voltage corresponding to a reference illumination of the road stud;
    a light emitting control unit configured to interrupt supply of power to the light emitting unit when the peripheral illumination of the road stud is equal to or more than the reference illumination, and configured to allow the supply of the power to the light emitting unit only when the peripheral illumination of the road stud is less than the reference illumination, based on a result comparing the applied voltage of the illumination sensor unit with the reference voltage of the reference-voltage generating unit, thus performing a flickering control mode of the light emitting unit and thereby carrying out a sight guidance operation of the road stud; and
    a road stud type-identification unit identifying the road stud as a pavement stud if the peripheral illumination of the road stud is more than a first preset illumination and is equal to or less than a second preset illumination of an illumination value that is larger than the first preset illumination, and identifying the road stud as a tunnel stud if the peripheral illumination of the road stud is equal to or less than the first preset illumination, when it is determined whether the peripheral illumination of the road stud is more than the first preset illumination and the peripheral illumination is compared with the second preset illumination of the illumination value that is larger than the first preset illumination,
    wherein, in a first mode set by a user when he or she manipulates a key, the light emitting control unit periodically and repeatedly performs a watch dog mode and a sleep mode at a preset time interval to perform a flickering operation of the light emitting unit,
    the light emitting control unit performs a pavement-stud flickering control mode in which, if the road stud type identified by the road stud type-identification unit is the pavement stud, in the watch dog mode, the supply of the power to the light emitting unit is interrupted when the peripheral illumination of the road stud is equal to or more than the reference illumination; and the supply of the power from the power supply unit to the light emitting unit is allowed and is maintained for a preset time, the supply of the power from the power supply unit to the light emitting unit is interrupted and then the light emitting control unit performs the sleep mode when the peripheral illumination of the road stud is less than the reference illumination, and the light emitting control unit performs a tunnel-stud flickering control mode in which, if the road stud type identified by the road stud type-identification unit is the tunnel stud, in the watch dog mode, the supply of the power to the light emitting unit is forcibly allowed and is maintained for a preset time, the supply of the power from the power supply unit to the light emitting unit is interrupted and then the light emitting control unit performs the sleep mode.

2. The apparatus of claim 1, wherein, in a second mode set by the user when he or she manipulates the key, the light emitting control unit periodically and repeatedly performs the watch dog mode and the sleep mode at a preset time interval to perform the flickering operation of the light emitting unit, the light emitting control unit checks the peripheral illumination of the road stud in the watch dog mode, and identifies the road stud as the pavement stud if the peripheral illumination of the road stud is equal to or more than the reference illumination, or the peripheral illumination of the road stud is less than the reference illumination while a difference value between the peripheral illumination of the road stud and the reference illumination is not within a range of a preset difference value, or the peripheral illumination of the road stud is less than the reference illumination while the difference value between the peripheral illumination of the road stud and the reference illumination is within the range of the preset difference value but is not maintained for a preset time, so that the light emitting control unit performs a pavement-stud flickering control mode in which the supply of the power to the light emitting unit is interrupted when the peripheral illumination of the road stud is equal to or more than the reference illumination, and the supply of the power from the power supply unit to the light emitting unit is allowed and is maintained for a preset time, the supply of the power from the power supply unit to the light emitting unit is interrupted, and then the light emitting control unit performs the sleep mode when the peripheral illumination of the road stud is less than the reference illumination, and the light emitting control unit checks the peripheral illumination of the road stud, and identifies the road stud as the tunnel stud when the peripheral illumination of the road stud is less than the reference illumination while the difference value between the peripheral illumination of the road stud and the reference illumination is within the range of the preset difference value and is maintained for the preset time, so that the light emitting control unit performs a tunnel-stud flickering control mode in which the supply of the power to the light emitting unit is forcibly allowed and maintained for a preset time, the supply of the power from the power supply unit to the light emitting unit is interrupted, and then the light emitting control unit performs the sleep mode.

3. The apparatus of claim 2, wherein the apparatus includes:

an overturning detecting sensor unit configured to detect whether the road stud is overturned and then apply a sensed signal, when it is determined whether the peripheral illumination of the road stud is more than the first preset illumination and the peripheral illumination is compared with the second preset illumination of the illumination value that is larger than the first preset illumination, wherein the road stud type-identification unit primarily checks the sensed signal of the overturning detecting sensor unit that is configured to detect whether the road stud is overturned in the watch dog mode, and detects the peripheral illumination of the road stud for a preset time from a moment when the road stud is not overturned and calculates an average peripheral illumination value of the road stud, in the case where the road stud is not overturned, and then determines whether the calculated average peripheral illumination value of the road stud is more than the first preset illumination and compares the calculated average peripheral illumination value with the second preset illumination of the illumination value that is larger than the first preset illumination.

4. The apparatus of claim 1, wherein the apparatus includes an overturning detecting sensor unit configured to detect whether the road stud is overturned and then apply a sensed signal, when it is determined whether the peripheral illumination of the road stud is more than the first preset illumination and the peripheral illumination is compared with the second preset illumination of the illumination value that is larger than the first preset illumination, wherein the road stud type-identification unit primarily checks the sensed signal of the overturning detecting sensor unit that is configured to detect whether the road stud is overturned in the watch dog mode, and detects the peripheral illumination of the road stud for a preset time from a moment when the road stud is not overturned and calculates an average peripheral illumination value of the road stud, in the case where the road stud is not overturned, and then determines whether the calculated average peripheral illumination value of the road stud is more than the first preset illumination and compares the calculated average peripheral illumination value with the second preset illumination of the illumination value that is larger than the first preset illumination.

5. The apparatus of claim 1, further comprising:

a light emitting direction-detecting unit configured to detect a light emitting direction (including a side direction or a top direction) or a light emitting angle of the light emitting unit, under a control of the light emitting control unit, wherein the supply of the power from the power supply unit to the light emitting unit is allowed as follows:

a lighting duration for side light emitting is set as a reference lighting duration and is set to be shorter than a lighting duration for top light emitting by a preset time, and the lighting duration for the top light emitting is set to be longer than the lighting duration for the side light emitting by a preset time, and the light emitting direction of the light emitting unit is identified using a result detected by the light emitting direction-detecting unit, so that, in the case where the identified light emitting direction of the light emitting unit includes the top light emitting direction, the supply of the power is allowed for both the side light emitting and the top light emitting when the supply of the power is allowed from the power supply unit to the light emitting unit, the supply of the power is allowed for a time that is shorter than the lighting duration for the top light emitting by a preset time when the supply of the power is allowed for the side light emitting, and the supply of the power is allowed for a time that is longer than the lighting duration for the side light emitting by a preset time when the supply of the power is allowed for the top light emitting.

6. The apparatus of claim 5, wherein the supply of the power is allowed for the time that is shorter than the lighting duration for the top light emitting by the preset time when the supply of the power is allowed for the side light emitting, and the supply of the power is allowed for the time that is longer than the lighting duration for the side light emitting by the preset time when the supply of the power is allowed for the top light emitting, using a following procedure:

when the supply of the power is allowed from the power supply unit to the light emitting unit, a power value allowed for the side light emitting for a preset initial time is detected to calculate an initial average power value for the side light emitting, and a power value allowed for the top light emitting for the preset initial time is detected to calculate an initial average power value for the top light emitting, so that the supply of the power is allowed for the time that is shorter than the lighting duration for the top light emitting by a preset time when the supply of the power is allowed for the side light emitting, with some power values corresponding to a preset value among the calculated initial average power value for the side light emitting after the preset initial time has passed, and the supply of the power is allowed for the time that is longer than the lighting duration for the side light emitting by a preset time when the supply of the power is allowed for the top light emitting, with some power values corresponding to a preset value among the calculated initial average power value for the top light emitting after the preset initial time has passed.

7. An apparatus for controlling an operation of a road stud, the apparatus comprising:

a light emitting unit of the road stud;

a power supply unit configured to supply power to the light emitting unit;

an illumination sensor unit configured to apply a voltage corresponding to a peripheral illumination of the road stud;

a reference-voltage generating unit configured to apply a reference voltage corresponding to a reference illumination of the road stud;

a light emitting control unit configured to interrupt supply of power to the light emitting unit when the peripheral illumination of the road stud is equal to or more than the reference illumination, and configured to allow the supply of the power to the light emitting unit only when the peripheral illumination of the road stud is less than the reference illumination, based on a result comparing the applied voltage of the illumination sensor unit with the reference voltage of the reference-voltage generating unit, thus performing a flickering control mode of the light emitting unit and thereby carrying out a sight guidance operation of the road stud;

a road stud type-identification unit identifying the road stud as a pavement stud if the peripheral illumination of the road stud is more than a first preset illumination and is equal to or less than a second preset illumination of an illumination value that is larger than the first preset illumination, and identifying the road stud as a tunnel stud if the peripheral illumination of the road stud is equal to or less than the first preset illumination, when it is determined whether the peripheral illumination of the road stud is more than the first preset illumination and the peripheral illumination is compared with the second preset illumination of the illumination value that is larger than the first preset illumination; and a light emitting surface-sensing unit configured to sense a light emitting surface of the road stud, wherein, in a first mode set by a user when he or she manipulates a key, the light emitting control unit periodically and repeatedly performs a watch dog mode and a sleep mode at a preset time interval to perform a flickering operation of the light emitting unit, the light emitting control unit checks the peripheral illumination of the road stud and the light emitting surface of the road stud in the watch dog mode, and performs a pavement-stud flickering control mode in which the supply of the power to the light emitting unit is interrupted when the peripheral illumination of the road stud is equal to or more than the reference illumination, and the supply of the power from the power supply unit to the light emitting unit is allowed and is maintained for a preset time, the supply of the power from the power supply unit to the light emitting unit is interrupted and then the light emitting control unit performs the sleep mode when the peripheral illumination of the road stud is less than the reference illumination, if the light emitting surface of the road stud is composed of only a side light emitting surface and a type of the road stud identified by the road stud type-identification unit is a pavement stud, and the light emitting control unit checks the peripheral illumination of the road stud and the light emitting surface of the road stud, and performs a tunnel-stud flickering control mode in which the supply of the power to the light emitting unit is forcibly allowed and is maintained for a preset time, the supply of the power from the power supply unit to the light emitting unit is interrupted and then the light emitting control unit performs the sleep mode, if the light emitting surface of the road stud includes both the side light emitting surface and a top light emitting surface and the type of the road stud identified by the road stud type-identification unit in the watch dog mode is a tunnel stud.

8. The apparatus of claim 7, wherein, in a second mode set by the user when he or she manipulates the key, the light emitting control unit periodically and repeatedly performs a watch dog mode and a sleep mode at a preset time interval to perform a flickering operation of the light emitting unit, the light emitting control unit checks the peripheral illumination of the road stud and the light emitting surface of the road stud in the watch dog mode, and identifies the road stud as the pavement stud if the light emitting surface of the road stud is composed of only the side light emitting surface and the peripheral illumination of the road stud is equal to or more than the reference illumination, or the peripheral illumination of the road stud is less than the reference illumination while a difference value between the peripheral illumination of the road stud and the reference illumination is not within a range of a preset difference value, or the peripheral illumination of the road stud is less than the reference illumination while the difference value between the peripheral illumination of the road stud and the reference illumination is within the range of the preset difference value but is not maintained for a preset time, so that the light emitting control unit performs a pavement-stud flickering control mode in which the supply of the power to the light emitting unit is interrupted when the peripheral illumination of the road stud is equal to or more than the reference illumination, and the supply of the power from the power supply unit to the light emitting unit is allowed and is maintained for a preset time, the supply of the power from the power supply unit to the light emitting unit is interrupted, and then the light emitting control unit performs the sleep mode when the peripheral illumination of the road stud is less than the reference illumination, and the light emitting control unit checks the peripheral illumination of the road stud and the light emitting surface of the road stud in the watch dog mode, and identifies the road stud as the tunnel stud if the light emitting surface of the road stud includes both the side light emitting surface and the top light emitting surface, the peripheral illumination of the road stud is less than the reference illumination while the difference value between the peripheral illumination of the road stud and the reference illumination is within the range of the preset difference value and is maintained for the preset time, so that the light emitting control unit performs a tunnel-stud flickering control mode in which the supply of the power to the light emitting unit is forcibly allowed and maintained for a preset time, the supply of the power from the power supply unit to the light emitting unit is interrupted, and then the light emitting control unit performs the sleep mode.

9. The apparatus of claim 7, further comprising:

an overturning detecting sensor unit configured to detect whether the road stud is overturned and then apply a sensed signal, when it is determined whether the peripheral illumination of the road stud is more than the first preset illumination and the peripheral illumination is compared with the second preset illumination of the illumination value that is larger than the first preset illumination, wherein the road stud type-identification unit primarily checks the sensed signal of the overturning detecting sensor unit that is configured to detect whether the road stud is overturned in the watch dog mode, and detects the peripheral illumination of the road stud for a preset time from a moment when the road stud is not overturned and calculates an average peripheral illumination value of the road stud, in the case where the road stud is not overturned, and then determines whether the calculated average peripheral illumination value of the road stud is more than the first preset illumination and compares the calculated average peripheral illumination value with the second preset illumination of the illumination value that is larger than the first preset illumination.

10. The apparatus of claim 7, wherein the supply of the power is allowed from the power supply unit to the light emitting unit, using a following procedure:

a lighting duration of the side light emitting surface is set as a reference lighting duration, the lighting duration of the side light emitting surface is set to be shorter than a lighting duration of the top light emitting surface by a preset time, and the lighting duration of the top light emitting surface is set to be longer than the lighting duration of the side light emitting surface by a preset time, so that, when the light emitting surface of the road stud is identified and the identified light emitting surface of the road stud includes the top light emitting surface, the supply of the power is allowed to both the side light emitting surface and the top light emitting surface when the supply of the power is allowed from the power supply unit to the light emitting unit, and the supply of the power to the side light emitting surface is allowed for a time that is shorter than the lighting duration of the top light emitting surface by a preset time, and the supply of the power to the top light emitting surface is allowed for a time that is longer than the lighting duration of the side light emitting surface by a preset time.

\* \* \* \* \*

UNITED STATES PATENT AND TRADEMARK OFFICE
CERTIFICATE OF CORRECTION

| | | |
|---|---|---|
| PATENT NO. | : 9,807,850 B1 | Page 1 of 1 |
| APPLICATION NO. | : 15/246910 | |
| DATED | : October 31, 2017 | |
| INVENTOR(S) | : Jong Tai Park | |

It is certified that error appears in the above-identified patent and that said Letters Patent is hereby corrected as shown below:

On the Title Page

Title delete "OPEARTION" and insert therein --OPERATION--

Signed and Sealed this
Ninth Day of January, 2018

Joseph Matal
*Performing the Functions and Duties of the*
*Under Secretary of Commerce for Intellectual Property and*
*Director of the United States Patent and Trademark Office*